J. W. FRAZIER.
FURNACE CHARGING APPARATUS.
APPLICATION FILED AUG. 12, 1913.

1,331,703.

Patented Feb. 24, 1920.
6 SHEETS—SHEET 1.

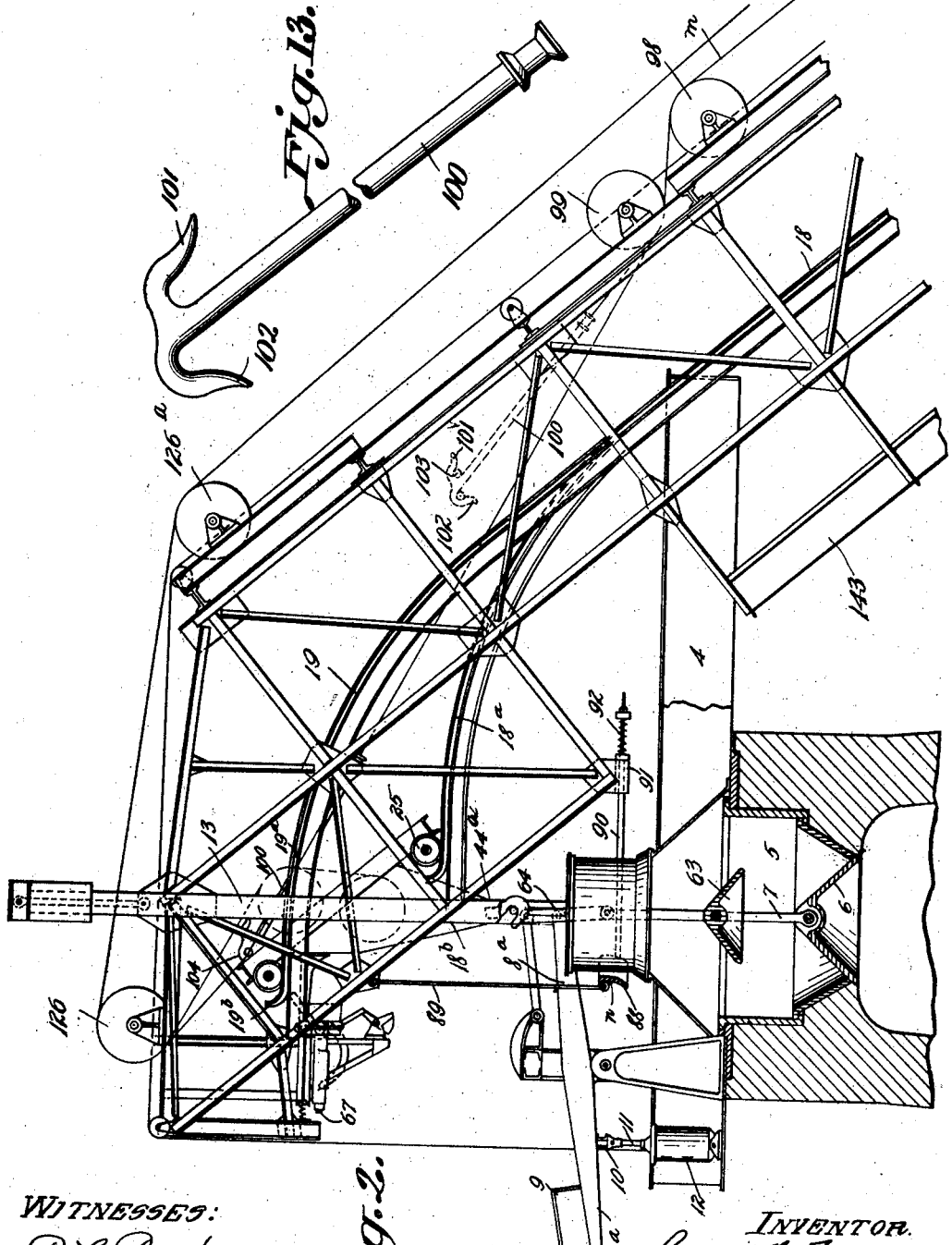

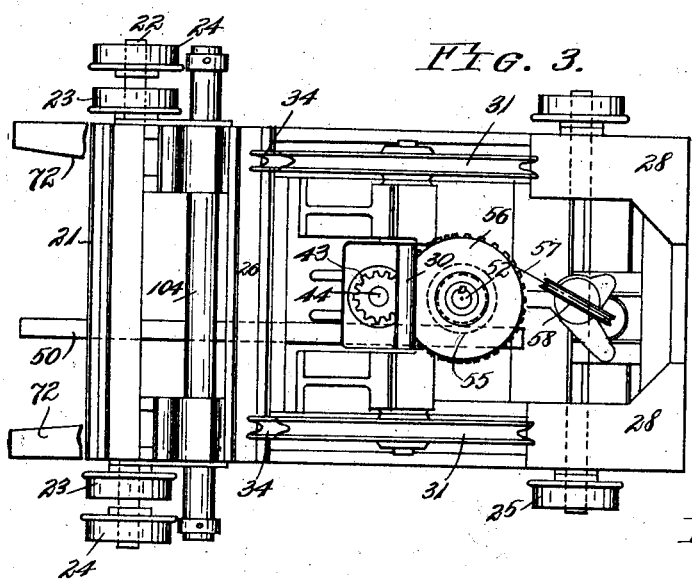
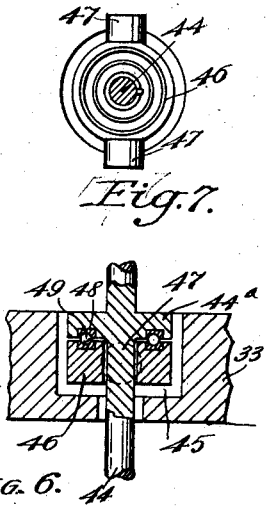
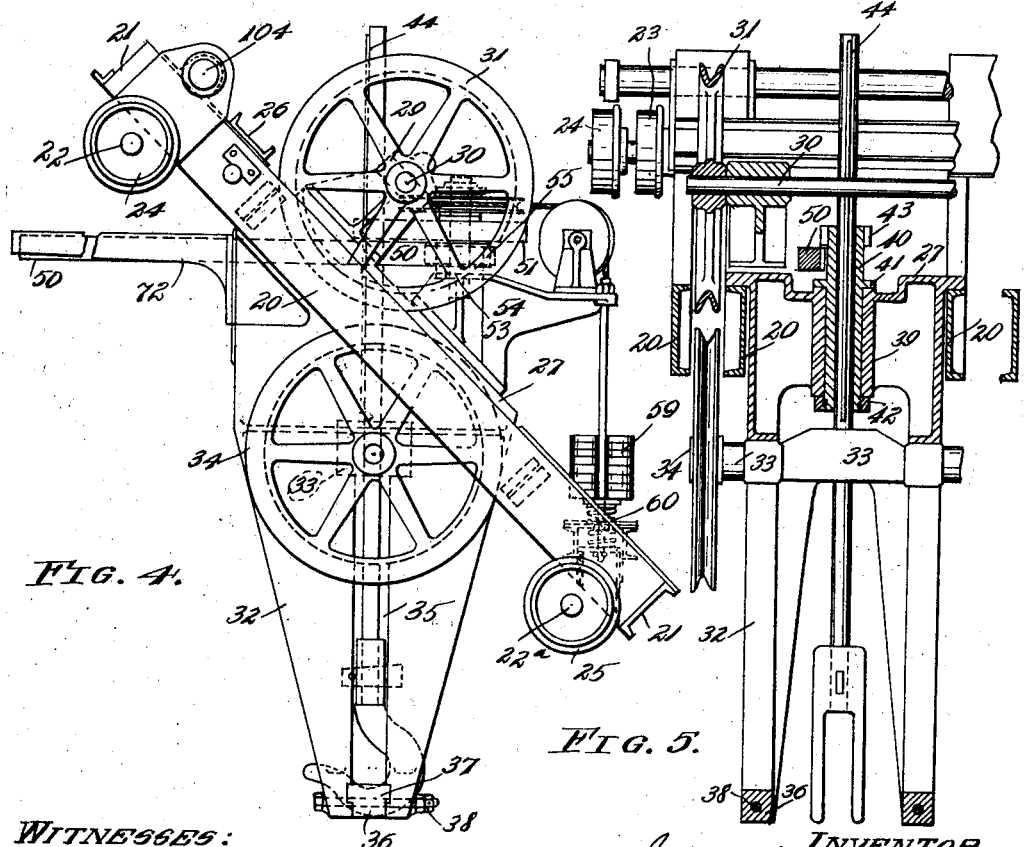

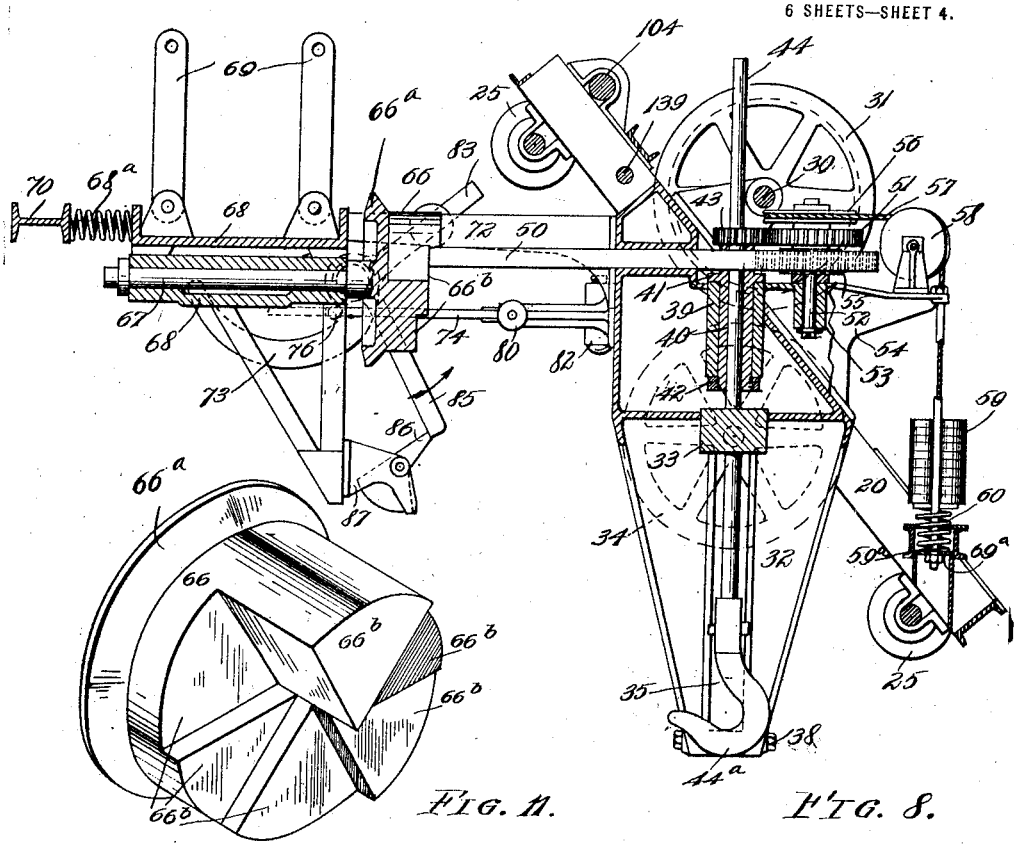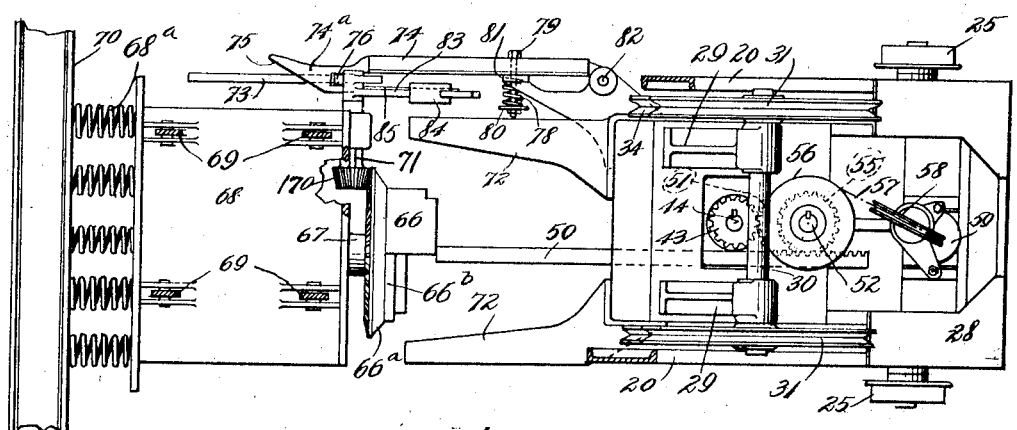

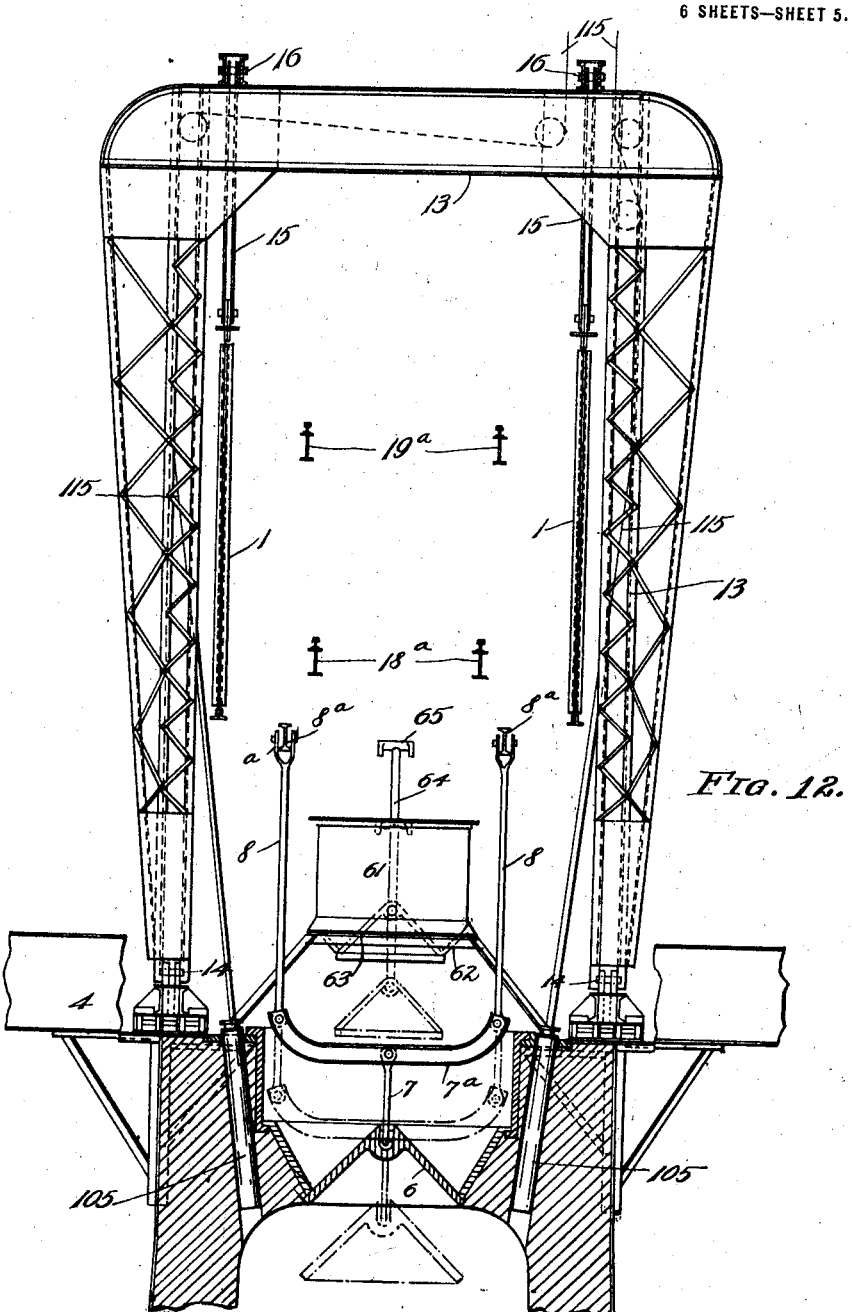

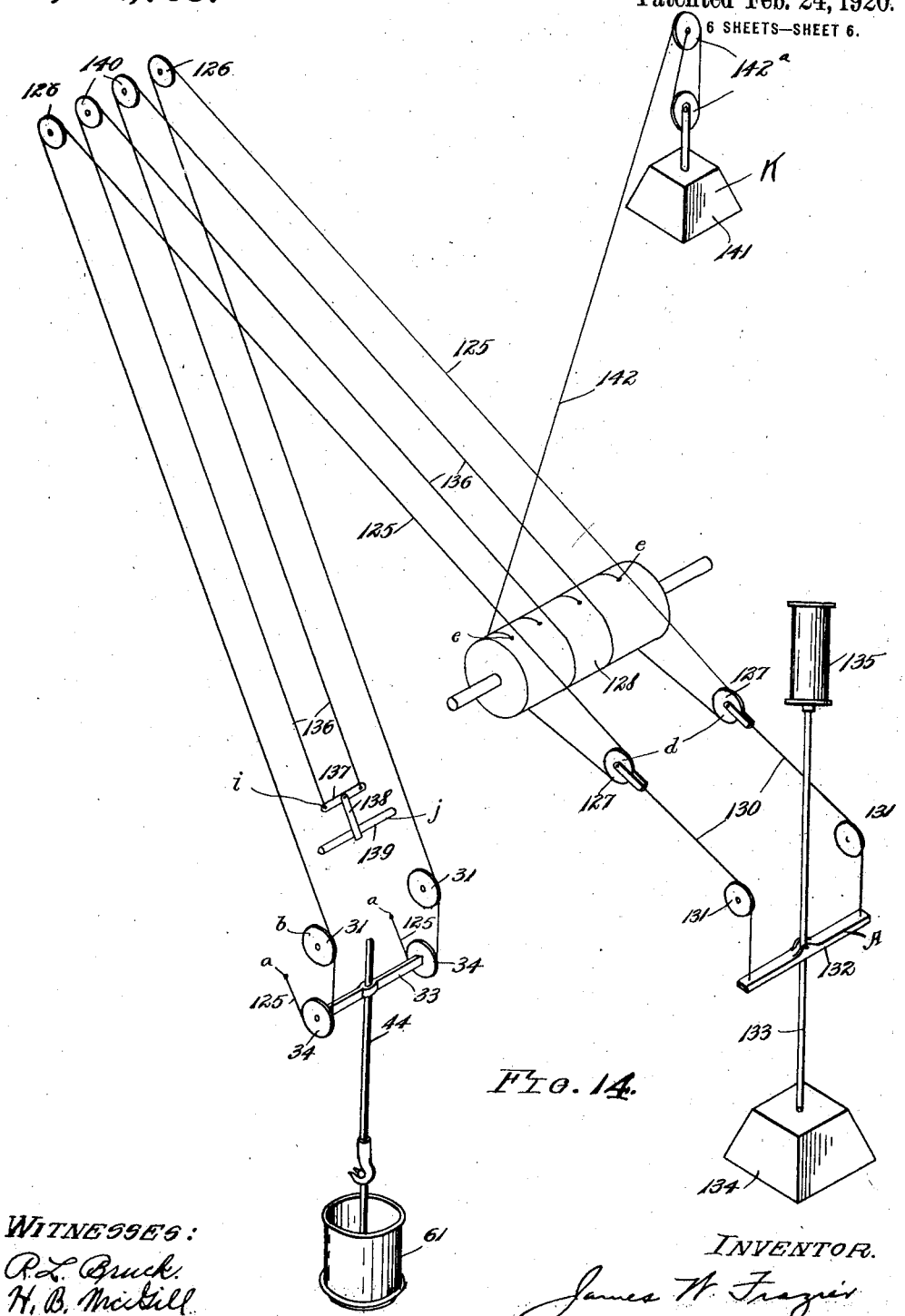

UNITED STATES PATENT OFFICE.

JAMES W. FRAZIER, OF CLEVELAND, OHIO.

FURNACE-CHARGING APPARATUS.

1,331,703. Specification of Letters Patent. Patented Feb. 24, 1920.

Application filed August 12, 1913. Serial No. 784,407.

*To all whom it may concern:*

Be it known that I, JAMES W. FRAZIER, a citizen of the United States, residing at Cleveland, in the county of Cuyahoga and State of Ohio, have invented a certain new and useful Improvement in Furnace-Charging Apparatus, of which the following is a full, clear, and exact description, reference being had to the accompanying drawings.

Figure 1:
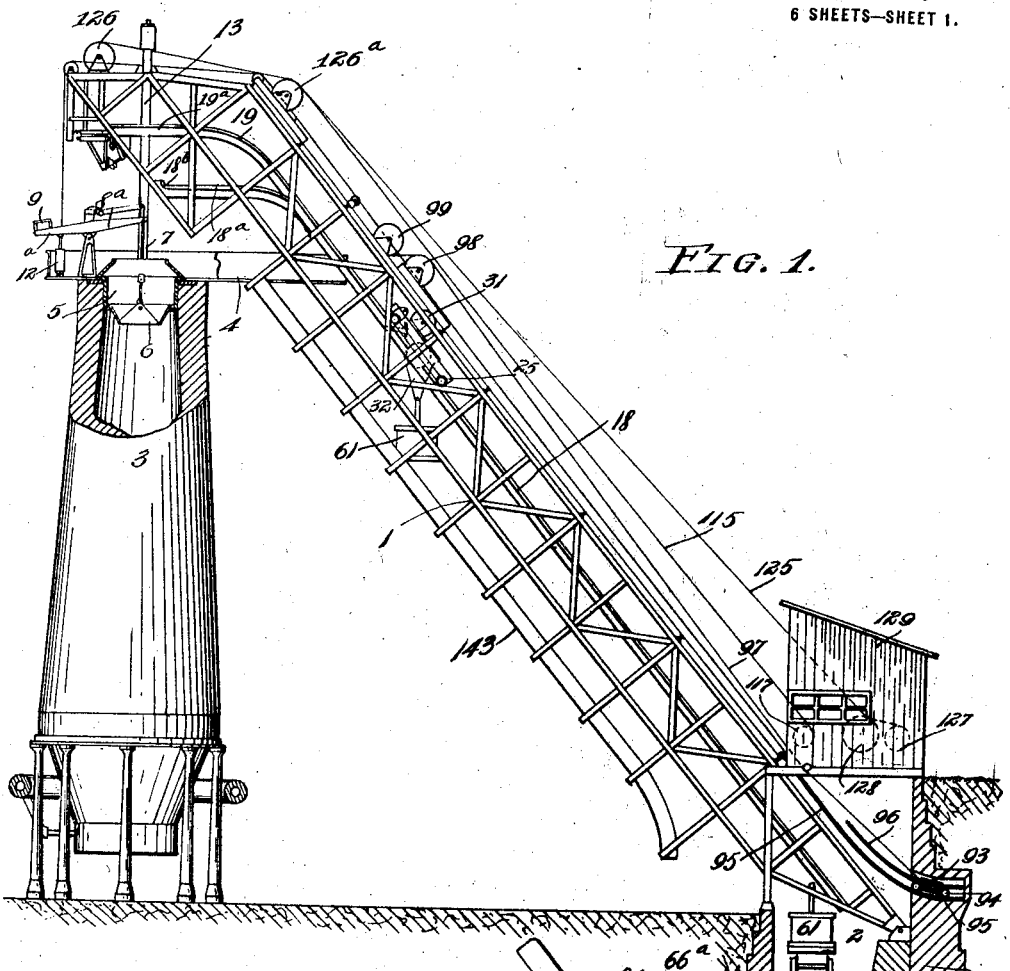
Figure 10:
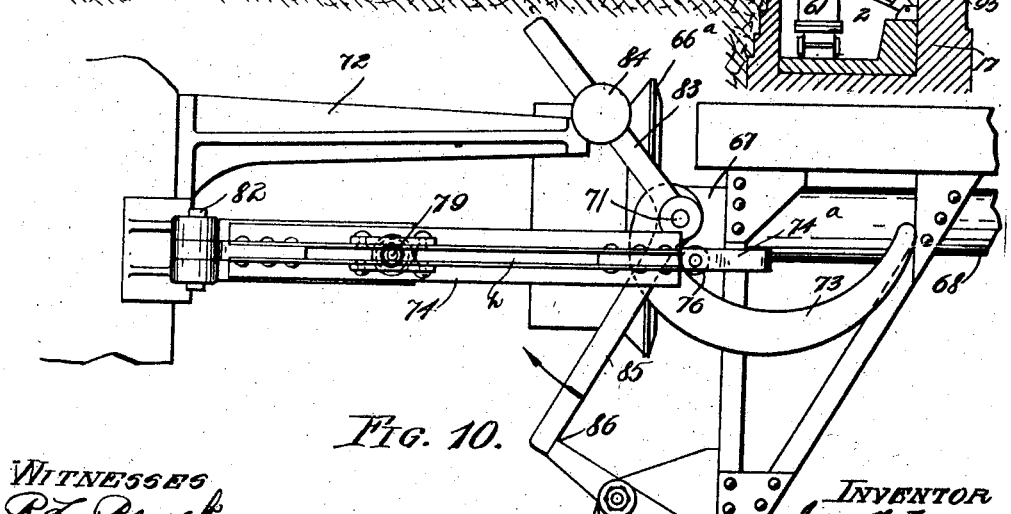

This invention relates to apparatus for charging blast furnaces and has for its general objects the provision of an apparatus of this character which may be applied to existing furnace installations without the necessity of altering the same; wherein the apparatus may be so applied and utilized without producing a lateral thrust against the furnace top and without increasing the head room required above the furnace top; the provision of an apparatus which is extremely convenient in operation and one wherein the return of the trolley from its position on a substantially horizontal track above the furnace to a sharply inclined track may be conveniently and automatically accomplished; the provision of an extremely simple and effective form of mechanism for selectively rotating the bucket during each excursion or trip of the same to insure an equal distribution of the different-sized particles of the material within the charging hopper at the top of the furnace; also to improve the construction of the trolley whereby it coöperates with the other elements of the bucket-hoisting and rotating means and with the counterbalancing means. With the foregoing objects in view, the invention may be described further and more generally as consisting of the combinations of elements embodied in the claims hereto annexed and illustrated in the drawings forming a part hereof, wherein Figure 1 represents a side elevation of a furnace-charging apparatus constructed in accordance with my invention, showing the same applied to a conventional form of furnace; Fig. 2 is an enlarged detail, partly in section and partly in elevation, of the upper end of the furnace and the upper end of the bridge, showing the trolley and bucket in operative relation to the furnace; Fig. 3 represents a top plan view; Fig. 4 a side elevation, and Fig. 5 a transverse sectional view through the trolley; Fig. 6 is a sectional detail of the trolley showing the manner in which the bucket shaft is rotatably supported; Fig. 7 a detail of the swivel bearing for the bucket shaft; Fig. 8 is a central longitudinal section view taken through the trolley and the coöperating bucket-rotating mechanism; Fig. 9 a plan view of the mechanism shown in Fig. 8; Fig. 10 a detail in side elevation of said mechanism; Fig. 11 a detail in perspective of the disk which controls the rotation of the bucket shaft; Fig. 12 a view, partly in section and partly in elevation, of the upper end of the furnace, showing the manner in which the bridge is mounted thereon and the connections for raising and lowering the furnace closure; Fig. 13 an elevation of the hook by which the counterweight is automatically applied to the trolley to return the same to the inclined part of the track; and Fig. 14 a diagrammatic view in perspective illustrating the mechanism for hoisting the trolley and for raising and lowering the bucket.

Describing by reference characters, the various parts illustrated herein, 1 denotes an inclined bridge extending from any convenient loading station 2 to the top of a furnace 3 of usual construction. In the drawing, the furnace is shown as provided with a loading platform 4, such as is commonly used with these furnaces and to which my invention is adapted to be applied without the necessity for any material alteration in or addition to the same.

The furnace is provided with the usual charging hopper 5 into which the material from the charging device is dumped and in which it is retained temporarily until such time as it is desirable to charge the furnace. The hopper is provided with the usual conical closure or bell 6 supported by a link 7 from the middle of an equalizer bar 7ᵃ the ends of which are connected by rods 8 to the ends of a pair of parallel levers 8ᵃ each of which carries at its opposite ends a counterweight 9. (See Figs. 2 and 12.) The counterweighted ends of these levers are connected by a cross bar 10 to which there is attached a piston rod 11, connected with a piston rod (not shown) in a cylinder 12, said cylinder being supplied with fluid under pressure for the purpose of operating said piston. The furnace and the various parts thereof thus described are of ordinary or conventional construction and need no further description.

The upper end of the bridge is supported from the platform by means of an inverted U-shaped frame 13 (see Fig. 12), said frame having its lower end pivoted to the platform as shown at 14, the bridge being suspended from the top of this frame by means of links 15, which are hinged or pivoted from the frame as shown at 16, the bridge construction being indicated generally at 1. By this manner of suspension, it will be apparent that the upper end of the bridge is not only yieldingly supported by the platform whereby the furnace top is relieved from any lateral thrust due to the expansion and contraction of the bridge, but that the only thrust upon the furnace is a vertical thrust, so that the furnace is relieved from any lateral thrust which might tend to destroy or injure the same, and particularly the upper part thereof.

The bridge is built of structural metal and is of ordinary truss construction having its lower end supported on a pier 17. The bridge supports the track rails 18, which extend upwardly from the lower end thereof at the angle of inclination of the bridge itself to a point a short distance above the platform 4, where they are extended nearly horizontally, as shown at 18$^a$, above such platform to a point above the furnace. On each side of the upper ends of the sharply inclined portions of the rails 18 there is located a rail 19 which extends upwardly at the same inclination as the inclined rails 18 to a point considerably above the horizontally extending portions of the rails 18, at which point it is also deflected in a direction substantially parallel with the upper or deflected portions 18$^a$ of the rails 18, as shown at 19$^a$. The purpose of this construction, as will appear more fully hereinafter, is to retain the trolley at dumping position in the same inclined position which it occupies while ascending the bridge and to permit this action in conjunction with the projecting platform with which such furnaces are usually provided without requiring any more head room above the furnace than would be necessary were the platform omitted or were it of greatly less lateral extent. The extreme ends of the rail sections 18$^a$ and 19$^a$ are bent upwardly, as shown at 18$^b$ and 19$^b$ to form stops for the wheels of the trolley.

With the bridge and track thus described, I employ a carrier for the charging device or bucket, said carrier being a trolley possessing certain characteristics which enable it to coöperate with the parts before described and with the hoisting and lowering mechanism and the bucket-supporting and rotating mechanism to be described hereinafter. The trolley is constructed generally as follows:—

The trolley consists generally of a pair of double side frames 20, preferably constructed of channel-members spaced apart and having their flanges facing each other, as shown more particularly in Fig. 5, these side frames being connected by end sills 21. Carried by these side frames are the bearings for the front and rear axles, 22 and 22$^a$ respectively. The front axle 22 is provided with two sets of wheels, the inner wheels 23 being arranged to coöperate with the rails 18 and the outer wheel 24 with the rails 19, as indicated in Fig. 3. The rear wheels 25 are adapted to ride upon the tracks 18.

The side frames of the trolley are connected by a transverse sill 26, a central transverse plate 27, and rear corner plates 28. Secured to the transverse plate 27 are the brackets 29 which carry the journals for a shaft 30 on which are mounted sheaves 31, the sheaves being located on opposite sides of the trolley frame. Suspended from the side frames 20 are the side members 32. These side members are provided each with a vertical slot for the cross head 33 on the outer ends of which are supported sheaves 34, one on each side of the trolley frame and beneath the sheaves 31. Vertical slots in the members 32 are indicated at 35. The bottom of each slot may be closed in any convenient manner, as by means of a block 36 fitted in the lower end of each slot and having projecting tenons engaging mortises in the side member 32 and secured in place by means of a bolt 38 extending through the block and the bottom of the side member.

The central portion of the transverse plate 27 is provided with a sleeve 39 and within this sleeve there is rotatably mounted a sleeve 40 which projects above and below the plate and is provided with a flange 41 by which it rests upon the top of the sleeve 39. The lower end of the sleeve 40 is extended below the sleeve 39 and is there provided with a nut 42, while the upper end is provided with a pinion 43, rigid therewith, for a purpose to be explained hereinafter.

The bucket shaft 44 is reciprocably mounted within the sleeve 40 and is keyed thereto, so as to rotate therewith. This shaft is rotatably supported by the cross head 33 (see Figs. 6 and 7).

The cross head 33 is provided with a recess 45 which contains a swiveled bearing 46 provided with trunnions 47 whereby it is pivotally supported in the recess by the cross head. The rod 44 is provided with a complementary bearing plate 44$^a$ which is preferably formed integral with the rod and ball races 48 are provided for the reception of the balls 49. The cross head 33 bears against the upper ends of the slots 35 except during the time when the contents of the bucket or charging device suspended therefrom are discharged into the furnace.

Coöperating indirectly with the pinion 43 (see Figs. 4—5—8—9) is a rack 50 which is guided by the trolley frame and projects forwardly beyond the same. This rack, as will be explained hereinafter, coöperates with mechanism for selectively rotating the shaft 44 and the bucket or furnace-charging device suspended therefrom to discharge the heavier particles of ore or other material to different segments of the furnace hopper. For the purpose of restoring the rack and the bucket shaft to their initial positions after such operation, the following mechanism, carried by the trolley, is employed. The pinion 43 meshes with a gear 51, mounted on a shaft 52 suitably supported by the trolley, as by means of a bearing 53 carried in the bracket 54. A pinion 55 mounted on the same shaft with the gear 51 meshes with the rack 50. From this construction, it will be apparent that the shaft 44 will be rotated a distance dependent upon the throw of the rack 50. For the purpose of restoring the shaft and rack to initial position after such operation of the rack, the shaft 52 is provided with a sheave or drum 56 to which there is attached a suitable rope 57 which extends over a vertical sheave 58 and is connected to a counterweight 59, the counterweight in turn resting upon the spring 60 which yieldingly limits the return movement of the rack and shaft. The counterweight is slidably supported on rods 59$^a$, and these rods extend through the spring 60 and carry the abutment 69$^a$ for the lower end of the same. The shaft 44 is provided at its lower end with a double hook 44$^a$ which double hook is adapted to receive the T-shaped handle at the top of the bucket-suspending rod.

The furnace charging device which is shown as carried by the trolley is a bucket of usual construction and comprises a hollow cylindrical body 61 (see Fig. 12) having an inverted frusto-conical bottom 62 which is adapted to be closed by a conical valve 63 suspended by a vertical rod 64 having the T-shaped handle 65 referred to hereinbefore, and which handle is engaged by the double hook 44$^a$ (see Figs. 2 and 12). Reference has been made to the mechanism which coöperates with the rack and pinion and the gear on the bucket shaft 44 to selectively rotate this shaft prior to dumping the bucket. This mechanism is carried by the bridge adjacent to and beyond the upwardly deflected ends 19$^b$ of the rails 19 and is constructed as follows,—see particularly Figs. 2, 8, 9, 10, 11: 66 denotes a disk carried by a horizontally arranged shaft 67, the shaft being supported by a frame 68 which is suspended by links 69 from any convenient portion of the bridge. Between the end of this frame and a suitable abutment rail 70 are interposed a plurality of springs 68$^a$, which serve as shock absorbers or buffers and yieldingly resist the impact of the trolley against the disk carrying frame. The disk is provided on its rear face with a bevel gear 66$^a$ meshing with a pinion 170 which is mounted on a shaft journaled in the frame 68, the shaft being indicated at 71. The disk is provided with a plurality of vertically extending segmental faces 66$^b$, these faces being in different vertical planes and the distance between said planes being preferably equidistant. In the embodiment shown herein, the disk is provided with six such faces of equi-angular extent. The trolley is provided with a pair of arms 72 which are spaced apart so as to straddle the disk 66 and abut against the swinging frame 68 to prevent inaccuracy in the throw of the rack by its impingement against the disk 66 as well as to arrest the movement of the trolley.

Secured to the shaft 71 is a curved arm 73 which is adapted to be engaged by a latch 74 carried by the trolley. This latch has a hooked end 74$^a$ provided with a beveled face 75 which is adapted to engage the curved arm as the trolley approaches its final position above the furnace top and be deflected outwardly thereby to enable the hook to engage the rear surface of said curved arm when moved to initial position. The latch is provided with an anti-friction roller 76 for the purpose of so engaging the curved arm and is brought back to and retained in its arm-engaging position by means of a spring 78 mounted upon a pin 79 which is carried by the latch arm, the spring engaging a disk 80 on said pin and a fixed portion of the trolley, indicated at 81. The pivotal connection between the latch arm and the trolley is shown at 82. 83 denotes a lever arm which projects from the shaft 71 and is provided with a weight 84, and 85, a third arm projecting from this shaft. The end of the arm 85 is adapted to engage the nose 86 of a weighted arm or dog which is pivotally supported by the swinging frame.

With the parts constructed as described, the rotation of the bucket shaft will be accomplished as follows: The end of the rack 50 will engage one of the segmental faces 66$^b$ as the trolley approaches its final position above the furnace. This will result in thrusting the rack forwardly until the arms 72 engage the swinging frame, thereby rotating the shaft 44, through the gear 51 and the pinions 43 and 55. The projection of the arms 72 is such that they will abut against the swinging frame which carries the disk 66 when the rack has been thrust the required distance by the particular disk face engaged, relieving the rack and the connected parts of the force of the blow and preventing inaccuracy in the throw of the rack. This movement of the rack will rotate the shaft 44 a distance dependent upon the particular segmental disk face engaged thereby. The bucket may then be lowered, by mechanism to be described hereinafter, to its seat on top of the furnace (see Fig. 2) and the bucket may be dumped by lowering the rod or shaft 44,— by mechanism also to be described hereinafter. Meanwhile the latch hook 74 will have engaged the curved arm 73. As the trolley is returned to the inclined portion of the track, its movement away from the furnace causes the hook to rotate the curved arm 73 until the weight 84 passes the upper center, whereupon this weight operates to complete the revolution of the shaft 71.
The end of the arm 85 strikes the projecting nose 86 of the dog 87, swings past the same and, as the weighted arm 83 tends to swing it downwardly, it is caught by the nose 86 and the parts are retained in position for the next excursion of the trolley. The pinion 170 and gear 66ª are so proportioned that the revolution of the shaft 71, thus accomplished, will advance the disk an angular distance equal to the angular extent of one of its segmental faces. Assuming that there are six segments to the disk the rod 44 will be given a rotary movement for every excursion of the trolley which is a multiple of sixty degrees, whereby the heavier lumps of material in the bucket will be directed around corresponding sixty-degree segments of the hopper 5. The counterweight 59, rope 57 and sheave 56 serve to return the rack 50 and the shaft 44 to a predetermined initial position after such actuation of the shaft by the disk, whereby the parts will be set for the next selective rotation of the shaft by the appropriate disk segment.
A bumper is provided for the bucket which is shown particularly in Fig. 2 the bumper comprising a curved horizontally arranged saddle 88 which is suspended from the bridge by means of a pair of links
89. Rods 90 are connected to the ends of the saddle and extend forwardly through guides 91 carried by the bridge, the ends of the rods being provided with compression springs 92 which serve to absorb the shock imparted to the saddle by the impact of the bucket thereagainst.

It is important to the efficient operation of my mechanism that the inclination of the trolley should be the same when above the furnace as when ascending and descending the bridge. This result is obtained and the use of unnecessary head room is avoided by extending the track sections 18ª and 19ª in a substantially horizontal direction above the furnace. In order to return the trolley quickly from the horizontal portions of these tracks to the sharply inclined portions thereof, I provide a counterweight 93, which is conveniently carried by a small truck 94. This truck is mounted on a track 95 near the lower end of the bridge, which track at its upper portion extends substantially parallel to the inclined portion of the bridge but which is substantially horizontal at its lower portion. Above the lower curved portion of the track 95 there is located a corresponding guard rail 96 which serves to keep the truck 94 on the track 95 when a pull is exerted upon the cable 97 connected to the forward end of the truck. The cable 97 extends upwardly and in the inclined direction of the bridge, passing over the sheave 98 and under the sheave 99 and being connected to a hook (see Figs. 2 and 13) the shank of which is shown at 100. The hook comprises two branches 101, 102, the first branch extending upwardly and the other downwardly. The branch 101 engages a suitable cross bar 103 carried by the bridge until such time as the branch 102 is engaged by a cross bar 104 carried by the front end of the trolley. The hook is so supported by the branch 101 and the bar 103 that its other branch 102 will be engaged by the trolley cross bar just before the trolley passes onto the horizontal portions 18ª and 19ª of the trolley rails. The movement of the trolley along these horizontal portions of the rails elevates the truck 94 and the counterweight thereon, and this weight, when the bucket has been dumped, operates to return the trolley quickly to the inclined portion of the track, where the upper branch of the hook is engaged by the suitable cross bar on the bridge and the hook and the attached counterweight are in position to operate upon the next return trip of the trolley.

Reference has been made hereinbefore to the sheaves 31 and 34 upon the trolley and to their coöperating in raising and lowering the bucket shaft 44. This action will be explained now in connection with Figs. 1, 2, and 14. Two cables or falls 125 are each fastened at one end to any suitable fixed portion of the trolley. These cables extend around the lower sides of the sheaves 34 and over the sheaves 31, thence around a pair of sheaves 126 at the upper end of the bridge, over sheaves 126ª near the top of the inclined part of the bridge, thence around the sheaves 127 below the drum 128 in the hoisting station 129, being secured at their lower ends to said drum. The sheaves 127 are attached by suitable ropes or cables 130, extending over pulleys 131, to an equalizer 132, which equalizer is pivotally connected to a piston rod 133 having at its lower end a counterweight 134 for the bucket, the upper end of the rod 133 being attached to a piston (not shown) in the cylinder 135, whereby the weight and the attached equalizer may be lifted when the bucket is in place above the furnace hopper, thereby permitting the falls 130 and 125 to 130 be slacked away to lower the bucket to its seat upon the furnace below the hopper and permit the bucket valve to be opened.

For the purpose of hoisting and lowering the trolley, a pair of cables or falls 136 are connected to an equalizer 137 pivoted to a bar 138 which is connected to a cross bar 139 carried by the trolley (see Fig. 8). These falls or cables 136 extend around a pair of sheaves 140 at the top of the bridge, preferably in line with the sheaves 126, thence over the sheaves 126ª to the drum 128, to which they are attached. A counterweight 141, connected to the drum 128 by means of a suitable cable or fall 142 and a tackle 142ª, serves to counterbalance the trolley.

With the parts arranged as described, it is believed that the operation will be clear. Assuming that the trolley is at the lower end of the bridge and that the drum is driven in the appropriate direction, the trolley will be hoisted along the sharply inclined portion of the bridge. Just before it reaches the horizontal extensions 18ª, 19ª of the rails, the trolley picks up the counterweight 93, through the engagement of the hook 102 with the cross bar 104. The rack 50 engages the particular segmental face of the disk 66 which is in operative relation thereto and the bucket shaft 44 is rotated thereby a distance which, in the embodiment shown herein and with the exception to be noted hereinafter, will be some multiple of sixty degrees. The first operating face will rotate the bucket rod sixty degrees, the the bucket being rotated back to initial position by the counterweight 59 after it has been dumped and elevated and the trolley begins its return trip to the hoisting station; the next operating disk face will rotate the rod 120 degrees, with a similar return to initial position by the counterweight; the next three faces will rotate the rod a distance of 180°, 240°, and 300°, respectively. The sixth face of the disk may and preferably will be set back so far as not to engage the rack before the bumper plates 72 engage the swinging frame 68, with the result that the bucket shaft will not be rotated at all, but the bucket will be dumped from the 360° (or 0°) position. After the bucket shaft has been rotated by the appropriate segmental face of the disk 66, the bucket may be lowered through the operation of the piston rod 133 by pressure fluid introduced into the cylinder, and the bucket seated upon, and its contents dumped into, the charging bell or hopper 5. The bucket valve is closed and the bucket raised from its seat by the counterweight by allowing the pressure fluid in the cylinder to escape, the hoisting drum is rotated in the reverse or lowering direction, the counterweight 93 assisting to move the trolley from the horizontal portion of the track to the inclined portion thereof. This retrograde movement of the trolley, through the engagement of the hook 74 with the curved arm 73, imparts a rotary movement to the disk sufficient to bring the next segmental face in operative relation to the rack 50. As the trolley descends the inclined portion of the track, the upper branch of the hook attached to the counterweight 93 is caught by its appropriate cross bar on the bridge, and the trolley is relieved of said counterweight. The contents of the charging bell may be dumped into the furnace from time to time, as desired, merely by operating the piston rod 11 through pressure fluid admitted to the cylinder 12.

While I have shown and described the disk as provided with six segmental surfaces, it is evident that the number of these surfaces may be varied as occasion may require, the object being to vary angularly the position of the bucket with respect to its seat on top of the charging bell during the different excursions of the trolley. By the construction specifically shown herein, such variation amounts to 60° between successive trips and, by this arangement, the heavier material will be distributed evenly in the charging bell or hopper 5, with like equal distribution in the furnace proper.

Suspended from the bridge beneath the trolley is a chute 143 which, in the event of the accidental discharge of the bucket load or of any part thereof, will carry such matter to the base of the bridge, near the loading station.

Having thus described my invention, what I claim is:—

1. In a furnace charging apparatus, the combination, with a furnace, of a charging device for said furnace, a carrier for said device, means for moving said carrier toward and from the furnace top, a rack and pinion on said carrier adapted to rotate the said charging device, means on said carrier tending to hold the rack and pinion in a predetermined position, and a series of abutments adapted to engage the rack successively during successive trips of the carrier to the furnace and to move said rack varying distances, said abutments being arranged so as to engage the rack at the end of a movement of the carrier toward the furnace.

2. In a furnace charging apparatus, the combination, with a furnace, of a charging device for said furnace, a carrier for said device, means for moving said carrier toward and from the furnace top, means on said carrier adapted to rotate the said charging device, means on said carrier tending to hold the rotating means in a predetermined position, and a series of abutments at the furnace top adapted to engage the rotating means successively during successive trips of the carrier to the furnace and to move said rotating means varying distances, said abutments being arranged so as to engage the rotating means at the end of a movement of the carrier toward the furnace.

3. In a furnace charging apparatus, the combination, with a furnace, of a charging device, a carrier therefor, a rack and pinion on said carrier adapted to rotate said charging device, means tending to hold the rack and pinion in a predetermined or initial position, and means adapted to engage the rack at the end of the movement of the carrier toward the furnace and to move said rack a distance which varies with successive trips of the carrier.

4. In a furnace charging apparatus, the combination, with a furnace, of a charging device, means movable with said device and adapted to rotate the same, means tending to hold the rotating means in a predetermined or initial position, and means at the furnace top adapted to engage the rotating means at the end of the movement of the charging device toward the furnace and to rotate the same a distance which varies with successive trips thereof, said rotating means being released at the beginning of the downward journey and brought back to the initial position by the holding means.

5. In a furnace charging apparatus, the combination, with a furnace, of a charging device for the furnace, a carrier therefor, a rack and pinion on said carrier adapted to rotate the charging device, a shaft, a plurality of angularly and longitudinally spaced abutments on said shaft adapted to be engaged by the rack when the carrier approaches the furnace, and means for automatically rotating the said shaft to bring successive abutments in operative relation to the rack, and means for operating the rack and pinion in a reverse direction from that imparted by said abutments.

6. In a furnace charging apparatus, the combination, with a furnace, of a charging device, a carrier therefor, means on said carrier adapted to rotate the charging device, a shaft, a plurality of angularly and longitudinally spaced abutments on said shaft adapted to be engaged by rotating means when the carrier approaches the furnace, and means for automatically rotating the said shaft to bring successive abutments in operative relation to the rotating means.

7. In a furnace charging apparatus, the combination, with a furnace, of a charging device therefor, a carrier for said device, a rack and pinion on said carrier adapted to rotate the charging device, means tending to maintain the charging device in an initial or predetermined position, a series of longitudinally spaced abutments adapted to be engaged by said rack when the carrier approaches furnace charging position, and means operated by the said carrier for bringing the said abutments successively in operative relation to said rack.

8. In a furnace charging apparatus, the combination with a furnace, of a charging device therefor, a carrier for said device, rotating means on said carrier adapted to rotate the charging device, means tending to maintain the charging device in an initial or predetermined position, a series of longitudinally spaced abutments adapted to be engaged by said rotating means when the carrier approaches furnace charging position, and means operated by the said carrier for bringing the said abutments successively in operative relation to said rotating means.

9. In a furnace charging apparatus, the combination, with a furnace, of a charging device therefor, a carrier for said device, a plurality of actuating devices adapted and arranged to rotate the charging device through different angular distances, means arranged and adapted to so rotate the charging device when the carrier is at substantially furnace charging position, and means controlled by the movement of the carrier away from the furnace for bringing different actuating devices into operative relation to the charging devices.

10. In a furnace charging apparatus, the combination, with a furnace, of a charging device therefor, a carrier for said device, means for moving the carrier toward and from the furnace, means including a rack and pinion mounted on the carrier for rotating the charging device, means on the carrier tending to return said rack and pinion to an initial or predetermined position, a shaft having thereon a plurality of angularly and longitudinally spaced abutments adapted to be engaged by the rack when the carrier is at substantially furnace charging position, and means controlled by the movement of the carrier away from furnace charging position for rotating said shaft a distance equal to the angular extent of each of said abutments.

11. In a furnace charging apparatus, the combination, with a furnace, of a charging device therefor, a carrier for said device, means for moving the carrier toward and from the furnace, means mounted on the carrier for rotating the charging device, means on the carrier tending to return the charging device to an initial or predetermined position, a shaft having thereon a plurality of angularly and longitudinally spaced abutments adapted to be engaged by the rotating means when the carrier is at substantially furnace charging position, and means controlled by the movement of the carrier away from furnace charging position for rotating said shaft a distance equal to the angular extent of each of said abutments.

12. In a furnace charging apparatus, the combination, with a furnace, of a charging device therefor, a carrier for said device, means for moving the carrier toward and from the furnace, means including a rack and pinion mounted on the carrier for rotating the charging device, means on the carrier tending to return said rack and pinion to an initial or predetermined position, a shaft having thereon a plurality of angularly and longitudinally spaced abutments adapted to be engaged by the rack, a gear carried by said shaft, a pinion meshing with said gear, a shaft for said pinion, and means controlled by the movement of the carrier away from the abutments for imparting a rotation to the second shaft.

13. In a furnace charging apparatus, the combination, with a furnace, of a charging device therefor, means for moving the device toward and from the furnace, means including a projection for rotating the charging device, means tending to return said device to an initial or predetermined position, a shaft having thereon a plurality of angularly and longitudinally spaced abutments adapted to be engaged by the projection, a gear carried by said shaft, a pinion meshing with said gear, a shaft for said pinion, and means controlled by the movement of the charging device away from the abutment for imparting a rotation to the second shaft.

14. In a furnace charging apparatus, the combination, with a furnace, of a charging device therefor, a carrier for said device, means for moving the carrier toward and from the furnace, means including a rack and pinion mounted on the carrier for rotating the charging device, means on the carrier tending to return said rack and pinion to an initial or predetermined position, a shaft having thereon a plurality of angularly and longitudinally spaced abutments adapted to be engaged by the rack, a gear on said shaft, a pinion meshing with said gear, a shaft carrying said pinion and a curved arm projection from the last mentioned shaft, a weighted arm projecting from said last-mentioned shaft, and a pivoted latch on the carrier adapted to engage the curved arm and thereby impart a rotary movement to the last mentioned shaft when the carrier moves away from said abutments.

15. In a furnace charging apparatus, the combination, with a furnace, of a charging device therefor, means for moving the charging device toward and from the furnace, means including a projection for rotating the charging device, means tending to return said charging device to an initial or predetermined position, a shaft having thereon a plurality of angularly and longitudinally spaced abutments adapted to be engaged by the projection when the charging device approaches the said abutments, a gear on said shaft, a pinion meshing with said gear, a shaft carrying said pinion and a curved arm projecting from the last mentioned shaft, a weighted arm projecting from the said last mentioned shaft, and a pivoted latch movable with the charging device and adapted to engage the curved arm and thereby impart a rotary movement to the last mentioned shaft when the charging device moves away from said abutments.

16. In a furnace charging apparatus, the combination, with a furnace, of a furnace charging device, a carrier therefor, means for moving said carrier toward and from the furnace top, means on said carrier for rotating the furnace-charging device, a yielding support adjacent to the top of the furnace, an abutment carried thereby adapted to engage the said rotating means, and one or more projections extending from the carrier and adapted to engage said support to limit the movement of the rotating means by the abutment.

17. In a furnace charging apparatus, the combination, with a furnace, of a charging device therefor, a carrier for said device, means for moving the carrier toward and from the furnace top, a frame adjacent to the top of the furnace, means including a movable projection on the carrier for rotating the charging device, an abutment on said frame adapted to engage said projection, and one or more projections on the carrier adapted to engage the frame after the engagement of the first projection by the abutment.

18. In a furnace charging apparatus, the combination, with a furnace having a charging bell or hopper, of a furnace charging device, means for moving the same toward and from the furnace bell or hopper, and a swinging spring-supported abutment adjacent to said bell or hopper adapted to engage the furnace charging device substantially when the latter is in operative relation to the charging bell or hopper, said abutment being suspended for movement substantially in a horizontal plane and being opposed in this movement by buffer springs.

19. In a furnace charging apparatus, the combination of a furnace charging device, a cable extending from the said device, a hoisting drum to which said cable is connected, a movable sheave interposed between said device and the hoisting drum and around which the cable extends, a counterweight for the charging device connected to the sheave, and power operated means for moving said counterweight and the sheave.

20. In a furnace charging apparatus, the combination of a furnace charging device, a pair of cables extending from the said device, a hoisting drum to which said cables are connected, a pair of movable sheaves interposed between the charging device and the hoisting drum and around which the cables extend, an equalizer connected to said sheaves, a counterweight for the charging device connected to the equalizer, and power operated means for moving said counterweight equalizer and sheaves to vary the effective length of said cables thereby to raise and lower the charging device.

21. In a furnace charging apparatus, the combination of a trolley, a bucket-supporting device carried by said trolley, cables connected to said device, a hoisting drum to which said cables are connected, a pair of sheaves interposed between the trolley and the drum and around which the cables extend, an equalizer connected to said sheaves, a counterweight for the bucket connected to said equalizer, and power operated mechanism for moving the counterweight and the equalizer to vary the distance between the sheaves and the drum.

22. In an apparatus of the character set forth, the combination of a trolley, a vertically movable cross head carried thereby, sheaves mounted on said cross head, cables connected to the trolley and extending around said sheaves, a hoisting drum to which said cables are connected, a furnace charging device supported from said cross head, and means, operating upon the cables between the sheaves and the drum, for varying the effective length thereof to raise and lower the cross head.

23. In a furnace charging apparatus, the combination, with a trolley, of a vertically reciprocable cross head carried by the trolley, a furnace charging device suspended from said cross head, cables connected to the cross head, a drum to which said cables are attached, and means engaging said cables, between the cross head and the drum, for varying the effective lengths thereof.

24. In an apparatus of the character described, the combination, with a trolley, of a vertically reciprocable cross head carried by said trolley, a furnace charging device suspended from said cross head, a hoisting drum, a cable extending from said cross head to said drum, a cable connected to the trolley and to said drum, a furnace charging device suspended from said cross head, and power-operated means engaging the first mentioned cable intermediate of the cross head and the drum and adapted to vary the effective length of said cable thereby to raise and lower the cross head.

25. In an apparatus of the character set forth, the combination, with a trolley, of a cross head reciprocably mounted in said trolley, a bearing carried by said cross head, a shaft having a bearing member coöperating with the first mentioned bearing and extending through the cross head, a sleeve carried by the trolley and through which said shaft extends and provided with a pinion, said shaft being reciprocable in said sleeve and keyed thereto, a second sleeve surrounding the first mentioned sleeve, means for moving said trolley, means controlled by the movement of the trolley for operating said pinion in reverse directions, and means connected with the cross head for raising and lowering the same.

26. In an apparatus of the character set forth, the combination, with a furnace, of an inclined bridge extending above the top of the furnace, a supporting cross frame arranged centrally of the furnace top and under which the upper end of the bridge is hung, means pivotally connecting said frame with the furnace top, furnace charging mechanism mounted on said bridge, and means for moving the same along the bridge.

27. In an apparatus of the character set forth, the combination, with a furnace, of a platform at the upper end of said furnace, an inverted U-shaped frame arranged centrally of the furnace top and having its lower end pivotally supported by the platform, and an inclined bridge having its upper end suspended within said frame.

28. In an apparatus of the character set forth, the combination, with a furnace, of a platform at the upper end of the furnace, an inverted U-shaped frame pivotally connected to said platform, an upwardly inclined bridge extending above said platform, and links pivotally supporting the upper end of said bridge from said frame.

In testimony whereof, I hereunto affix my signature in the presence of two witnesses.

JAMES W. FRAZIER.

Witnesses:
J. F. POLAND,
BRENNAN B. WEST.